United States Patent [19]
Watts

[11] 3,858,344
[45] Jan. 7, 1975

[54] ANGLER'S LURES
[76] Inventor: Peter J. Watts, Baldhu House, 38 Polkyth Rd., St. Austell, England
[22] Filed: July 31, 1973
[21] Appl. No.: 384,344

[30] Foreign Application Priority Data
Aug. 2, 1972 Great Britain.................... 35991/72

[52] U.S. Cl................ 43/42.05, 43/42.22, 43/43.13
[51] Int. Cl............................................. A01k 85/00
[58] Field of Search.............. 43/42.05, 42.2, 42.21, 43/42.19, 42.22, 42.46, 42.47, 43.13

[56] References Cited
UNITED STATES PATENTS
2,563,386  8/1951  Wight, Jr. ......................... 43/42.22
2,594,981  4/1952  Ohlund et al. .................... 43/42.22

FOREIGN PATENTS OR APPLICATIONS
615,092  12/1948  Great Britain..................... 43/42.22
895,229  5/1962   Great Britain..................... 43/42.22

Primary Examiner—Warner H. Camp
Attorney, Agent, or Firm—Sughrue, Rothwell, Mion, Zinn & Macpeak

[57] ABSTRACT

An angler's lure is provided with two lateral fins which are rotatable into two different settings, to cause right- or left-handed rotation of the lure selectively, by simple rotation of one part of the lure body relative to another.

11 Claims, 4 Drawing Figures

Patented Jan. 7, 1975
3,858,344
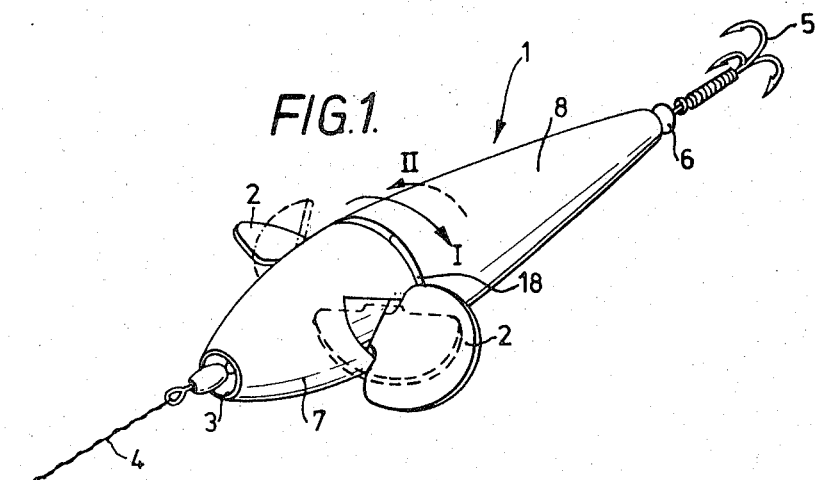
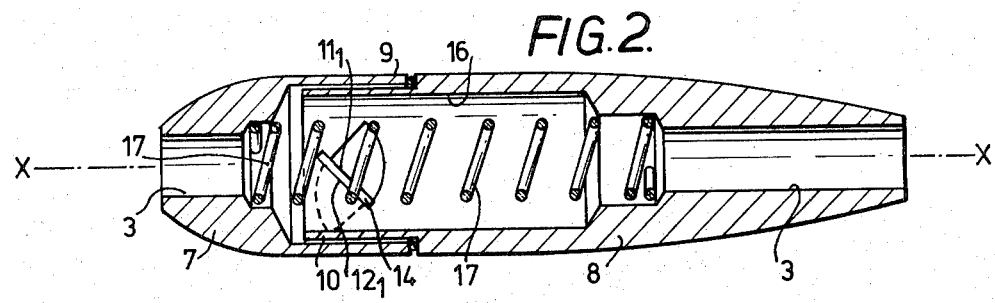
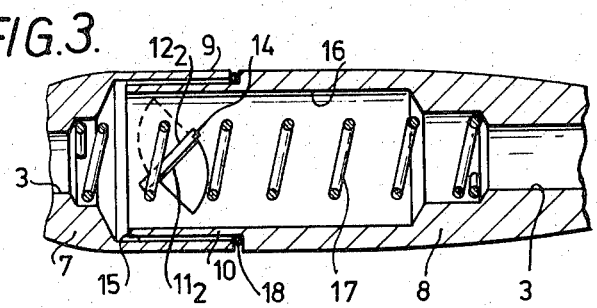
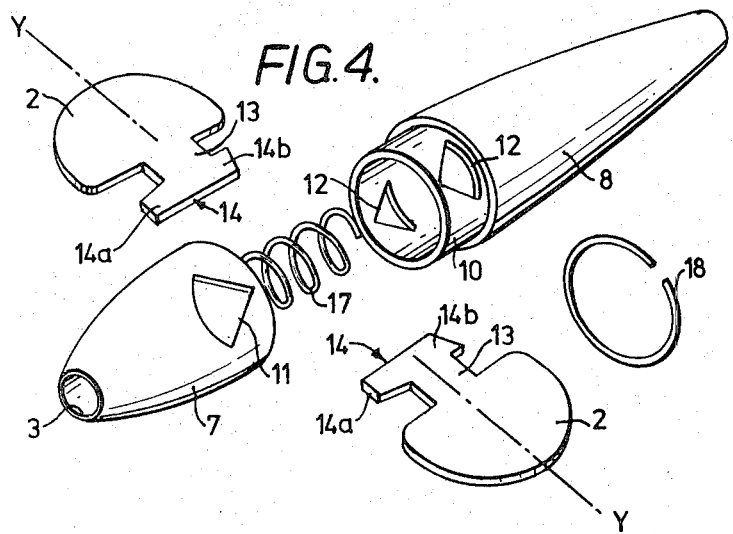

ANGLER'S LURES

BACKGROUND OF THE INVENTION

This invention relates to an angler's lure. More particularly, the invention concerns anglers' lures of the rotating kind which are attached to a fishing line near a hook and which have laterally projecting fins arranged to cause rotation of the lure about its longitudinal axis when water flows over the surface of the lure in the normal course of fishing.

A lure of the rotating type which is very popular with anglers in the so called 'Devon Minnow,' which has a streamlined body with two laterally projecting fins near the part of the body of maximum thickness. The fins, which are usually welded or brazed to the body, or formed integrally therewith, are arranged to cause rotation of the body in a specific direction when the lure is attached to a fishing line and trailed through the water. The rotation of the lure in the water simulates the movement of a fish through the water.

A practical difficulty associated with the use of spinning lures is that, despite the use of swivel connections between the lure and the remainder of a fishing line, the high speed of rotation of the lure causes, inevitably, a certain amount of twist in the line. This twist is cumulative in the sense that for successive casts of the line using the same lure the total amount of twist in the line progressively increases. The disadvantages of line twist are too well known to anglers to require enumeration, but they include: (a) a tendency for the line to become tangled when tension is relieved, a tendency which increases with increasing twist in the line and (b) a greater air resistance to movement of the line through the air, significantly reducing the distance which a twisted line can be cast.

The usual remedy adopted by anglers to avoid excessive line twist is to use alternately lures which rotate in opposite directions, so that the line twist caused by one lure is counteracted by the opposite line twist caused by the other lure. Typically, an angler may use a lure which rotates in one direction for five successive casts, and then change to an oppositely rotating lure for the next five successive casts. This procedure involves the tedious and time consuming operation of untying one lure from a line and tying on another lure at regular intervals, during which time the angler's line is out of action.

An object of the present invention is to provide an improved angler's lure of the spinning type in which the direction of rotation of the lure can be changed at will, without untying the lure from a line and without dismantling the lure.

More particularly, it is an object of the present invention to provide an angler's lure comprising an elongate body having two fins projecting laterally from the lure body on opposite sides thereof, both said fins being movable relative to the body without removal therefrom between a two stable configuration in which the fins are respectively arranged to cause rotation of the body about its longitudinal axis in opposite respective directions upon flow of water over the body in a given direction parallel to said longitudinal axis.

When using the lure according to this invention an angler simply has to change the setting of the lure fins from one stable configuration to the other and he is then ready to re-cast his line with the lure rotating in the opposite direction to that of the previous cast, so that the amount of line twist caused by the rotation of the lure can be kept easily within acceptable limits.

SUMMARY OF THE INVENTION

The angler's lure according to the invention comprises:

a. an elongate streamlined hollow body;

b. means defining two apertures on opposite sides of the body;

c. two fins projecting laterally from the body, the fins having respective root portions which pass through the respective apertures in the lure body, and the root portions having enlarged heads which are located within the hollow lure body and which render the fins captive in said apertures, said fins being rotatable in said apertures about transverse axes perpendicular to the longitudinal axis of the body between two respective stable limit positions in which the fins are inclined to the said longitudinal axis and respectively arranged to cause rotation of the lure in opposite respective directions about said axis upon flow of water over the lure body in a given direction parallel to said longitudinal axis, and d resilient biasing means within said lure body urging the fins into the two said stable limit positions selectively.

Preferably the root portions of the fins have opposite parallel faces which in both stable configurations of the fins are engaged by edges of the respective apertures in the two relatively rotatable parts of the body. Thus the apertures in each of the two relatively rotatable parts preferably have lateral straight edges which converge towards each other, the aperture edges of one part tapering towards one end of the body and the aperture edges of the other part tapering towards the other end of the body. Preferably each of the said apertures has a substantially triangular or sector shape.

Preferably the resilient biasing means comprises a helical spring located within the body and extending longitudinally thereof, opposite ends of the spring bearing against the respective parts of the body to urge the latter apart. In a preferred embodiment the apertures in the two relatively rotatable parts are such that upon moving the two parts longitudinally towards each other against the action of the spring the overlapping areas of the pairs of apertures on the cooperating portions of the two parts increase sufficiently to permit withdrawal of or insertion of the root portions of the two fins.

The preferred embodiment of the invention is held together, in effect, by the root portions of the two fins, which pass through the respective pairs of apertures in the two relatively rotatable parts of the body. To prevent the removal of the two fins from the lure body after assembly of the lure a removable stop is preferably provided which prevents the two body parts from moving towards each other sufficiently to enable the root portions of the fins to pass through the pairs of apertures in the two parts. The removable stop may, for example, comprise a resilient split band or ring which is fitted on to one of the body parts to engage an edge of the other body part when the two parts are moved towards each other against the action of the spring.

Preferably the root portion of each fin consists of a flat tongue integral with the fin itself and having at its inner end at least one lateral projection which engages the internal surface of the inner of the two overlapping portions of the body parts upon assembly of the lure.

BRIEF DESCRIPTION OF THE DRAWINGS

The invention will now be described, merely by way of example, with reference to the accompanying drawings, in which;

FIG. 1 is a diagrammatic perspective view of a lure according to a typical practical embodiment of the present invention, shown fitted to a fishing line;

FIG. 2 is a diagrammatic longitudinal section through the lure shown in FIG. 1, with the line omitted for the sake of clarity, showing the parts in one stable configuration;

FIG. 3 is a partial longitudinal section of the lure, corresponding to that of FIG. 2, showing the component parts in their other stable configuration, and FIG. 4 is a diagrammatic perspective exploded view of the components of the lure shown in FIGS. 1 to 3.

DETAILED DESCRIPTION OF THE ILLUSTRATED EMBODIMENT

Referring to the drawing, the illustrated embodiment of the invention is an improved spinning lure of the "Devon Minnow" shape having a streamlined body 1 and two laterally outwardly projecting fins 2 which are inclined to the longitudinal axis of the body 1 in such a direction as to cause rotation of the body 1 about its longitudinal axis when the water flows over the surface of the lure. In common with conventional spinning lures of this type the lure body 1 has a longitudinal through bore 3 through which a fishing line 4 terminating in a three pronged hook 5 passes. Between the body 1 and the hook 5 the line carries a small spherical bead 6 which acts as a bearing permitting free rotation of the body 1 about its longitudinal axis when it is drawn through the water by the line. In addition, in use of the line, one or more swivel joints would normally be included in the line upstream of the lure.

Notwithstanding the fact that the lure body 1 is rotatable about its longitudinal axis, and despite the inclusion of swivel joints in the line, there is a tendency for the line to become twisted in use, due to the high speed of the rotation of the lure. The lure of the present invention has readily reversible fins 2 which enable the direction of rotation of the lure to be reversed so as to counter any twist which has accumulated in the line after a period of use.

Thus the two fins 2 of the lure have a first configuration, shown in full lines in FIG. 1, in which they cause rotation of the lure body 1 about its longitudinal axis in the direction indicated by arrow I and a second configuration, shown diagrammatically in broken outline in FIG. 1, in which they cause rotation of the lure body about its longitudinal axis in the opposite direction, II in normal use of the lure.

The lure body 1 consists of two relatively rotatable parts, namely a front part 7 and a rear part 8, which fit together, as hereinafter described, to form a substantially continuous and smooth external streamlined surface, as illustrated in FIGS. 1 and 2. The front part 7 has a rearwardly extending sleeve portion 9 which surrounds a forwardly projecting sleeve portion 10 of the rear part 8, the two portions 9 and 10 having respective cylindrical surfaces which mate with each other and permit relative rotation of the two parts 7, 8 about the longitudinal axis X—X (FIG. 2) of the lure body.

Each of the mutually overlapping cylindrical portions 9, 10 of the two body parts 7, 8 is provided with a pair of diametrically opposed through apertures 11, 12 respectively. Each of the apertures 11 in the sleeve portion 9 of the front part 7 has the shape of a right-angled sector tapering towards the rear of the body 1 and each of the apertures 12 in the sleeve portion 10 of the rear part 8 has the shape of a right-angled sector tapering in the opposite direction, towards the front of the body 1, the two pairs of apertures 11, 12 having substantially the same shape and size and being arranged so that when the front part 7 is pushed fully home on the rear part 8 the apertures 11 and 12 can be brought into register with each other with a maximum area of overlap.

Each of the two fins 2 has a root portion 13 comprising a flat tongue integral with the fin itself and terminating in an enlarged head 14 formed by integral lateral projections at the end of the tongue. Each fin 2 and its root portion 13 preferably consists of a flat piece of metal such as brass stamped or cut from a single sheet.

The enlarged head 14 of each root portion 13 has a width which permits the insertion of the root portion 13 through the respective aligned pairs of slots 11, 12 in the two portions 9, 10 when the said slots are aligned in a position of maximum overlap, with the part 7 pushed fully home on to the part 8, as described previously. The insertion of the root portion 13 through the aligned apertures 11, 12 is accomplished by suitable rocking movement of the fin 2 in its own plane. Once the root portion 13 is fully inserted in the apertures 11, 12 it is retained against removal therefrom by the enlarged head 14 of the root portion 13.

The two body parts 7, 8 are formed with respective enlarged counterbores 15, 16, coaxial with the through bore 3, which face each other upon assembly of the two parts and which house a helical spring 17. The spring 17 is compressed between the annular shoulders formed at the junction of the counterbore 15 and the bore 3.

The action of the spring 17 in biasing the two body parts 7, 8 apart has the effect of bringing respective parallel edges of the overlapping apertures 11, 12 into engagement with opposite parallel faces of the root portions 13 of the two fins, thereby holding the fins 2 in fixed position at angles to the longitudinal axis X—X determined by the inclination of the said lateral edges of the apertures to said axis. In effect, the spring 17 causes the two fin root portions 13 to be clamped between respective edges of the overlapping apertures 11, 12 and holds the fins 2 resiliently in either of their two stable configurations.

FIG. 2 shows the lure in longitudinal section, with the fin 2 in the first stable configuration illustrated in full lines in FIG. 1. One of the fin root portions 13 is visible in FIG. 2, and it will be seen that it is clamped between an inclined edge $12_1$ of one of the apertures 12 and a parallel inclined edge $11_1$ of one of the apertures 11 in the overlapping portion 9 of the front part 7, the remainder of the aperture 11 being shown in broken outline. If, starting from the configuration shown in FIG. 2, the front portion 7 is rotated relatively to the rear portion 8 about the longitudinal axis X—X in a clockwise direction viewed from the front of the lure then the respective root portion 13 is rotated about its axis Y—Y (FIG. 4) until it reaches the second stable configuration, illustrated in partial section in FIG. 3, in which it is clamped between an opposite edge $12_2$ of the said aperture 12 and an opposite parallel edge $11_2$ of the aperture 11, the aperture 11 again being shown in broken outline in FIG. 3.

It will be seen that, in effect, the overlapping areas of the respective pairs of apertures 11, 12 on the front and rear parts 7, 8 respectively take the form of slots in the two stable configurations of the fins 2, these slots being inclined to the longitudinal axis $x-x$ of the body 1 in opposite directions. Since all intermediate positions of the respective root portions 13 between the two extreme positions shown in FIGS. 2 and 3 entail a movement of the two body parts 7, 8 towards each other, it follows that these two extreme positions are stable. Moreover, the action of water flowing over the surface of the body 1 in normal use of the lure exerts forces on the two fins 2 which reinforce the action of the spring 17, maintaining the stability of the fins 2 in which ever of the two configurations they are disposed.

Assembly of the lure 2 is effected in a simple manner by placing the spring 17 in one of the counterbores 15 or 16 and then fitting the front part 7 of the body 1 onto the rear part 8. The two parts 7, 8 are pushed towards each other to the fullest extent, until the rear edge of the front part 9 abuts the annular shoulder formed at the rear end of the sleeve portion 10 of the rear part 8. In this position, the two parts 7, 8 are relatively rotated until the two pairs of apertures 11, 12 are fully aligned with maximum overlapping area. The two fins 2 are then presented and their respective root portions 13 inserted in the respective aligned pairs of apertures 11, 12, as previously described. The two body parts 7, 8 are released after inserting the fins 2, and are forced apart by the spring 17 until the two fins 2 are gripped firmly between the edges of the respective pairs of apertures 11, 12. Assembly is then complete.

To facilitate the fitting of the two fins 2 upon assembly of the lure one of the two laterally projecting portions 14a, of each enlarged root head 14 is tapered, as illustrated in FIG. 4, while the other laterally projecting portion 14b is truncated.

After assembling the lure, a locking element in the form of a split annular resilient ring 18, having a natural diameter which is smaller than the external diameter of the sleeve portion 10, is slid onto the sleeve portion 10 over the tapering surface of the rear body part 8, and snaps into the circumferential groove defined between the two parts 7, 8. The thickness of the locking ring 18 is such that it prevents movement of the two parts 7, 8 axially towards each other to the extent necessary to enable the root portion 13 of the two fins 2 to be removed. Other convenient types of locking element may, of couse, be used.

The two parts 7, 8 of the body 1 are preferably formed of heavy material, brass being a suitable material from which the parts may be turned.

Although described with particular reference to a "Devon Minnow" type spinning lure, it will be appreciated that the invention is equally applicable to other types of spinning lure used in angling.

I claim:
1. An angler's lure comprising:
   a. an elongate streamlined hollow body constituted by front and rear parts which are relatively rotatable about the longitudinal axis of the body;
   b. means defining two pairs of overlapping apertures in the two body parts on opposite sides of the body;
   c. two fins projecting laterally from the body, the fins having respective root portions which pass through the respective pairs of over-lapping apertures in the body parts, said root portions having enlarged heads which are located within the hollow lure body and which render the fins captive in said apertures, the fins being rotatable in said apertures about transverse axes perpendicular to the longitudinal axis of the body upon relative rotation of the body parts, said fins having two respective stable limit positions in which they are inclined to the said longitudinal axis and respectively arranged to cause rotation of the lure in opposite respective directions about said axis upon flow of water over the lure body in a given direction parallel to said longitudinal axis, and
   d. resilient biasing means within said lure body urging the two body parts apart to bias the fins into the two said stable limit positions selectively.

2. A lure as defined in claim 1, wherein the root portions of the fins have opposite parallel faces which in both stable limit positions of the fins are engaged by edges of the respective overlapping apertures in the two relatively rotatable parts of the lure body.

3. A lure as defined in claim 2 wherein the apertures in each of the two relatively rotatable parts have lateral straight edges which converge towards each other, the aperture edges of one part tapering towards one end of the body and the aperture edges of the other part tapering towards the other end of the body.

4. A lure as defined in claim 3, in which each of the said apertures has a sector shape.

5. A lure as defined in claim 1, wherein the resilient biasing means comprise a helical spring located within the body and extending longitudinally thereof.

6. A lure as defined in claim 5, wherein the pairs of apertures in the two relatively rotatable parts overlap in the longitudinal direction whereby, upon moving the two parts longitudinally towards each other against the action of the spring the overlapping areas of the pairs of apertures on the cooperating portions of the two parts increase sufficiently to permit withdrawal of or insertion of the root portions of the two fins.

7. A lure as defined in claim 6, including a removable stop means preventing movement of the two body parts towards each other to an extent sufficient to enable the root portions of the fins to pass through the overlapping areas of the pairs of apertures in the two parts.

8. A lure as defined in claim 7, wherein the removable stop means comprises a resilient split ring element which is fitted on one of the body parts to engage an edge of the other body part when the two parts are moved towards each other against the action of the spring.

9. A lure as defined in claim 1, wherein the root portion of each fin consists of a flat tongue integral with the fin itself and having at its inner end at least one lateral projection which engages the internal surface of the inner of the two overlapping portions of the body upon assembly of the lure.

10. A lure as defined in claim 1, wherein the lure body has a streamlined external surface, the outer surfaces of the two parts of the body being flush with each other.

11. A lure as defined in claim 1, wherein the lure body is formed with a longitudinally extending through bore through which part of a fishing line passes in use of the lure.

* * * * *